Patented Sept. 17, 1935

2,014,850

UNITED STATES PATENT OFFICE 2,014,850

MANUFACTURE OF CARBOXYLIC ACID ESTERS FROM OLEFINES

Thomas Kane, Holborn, London, England, assignor to Edward Halford Strange, London, England No Drawing. Application March 6, 1933, Serial No. 659,835. In Great Britain March 8, 1932

8 Claims. (Cl. 260—106)

This invention relates to the manufacture of esters from aliphatic saturated mono-carboxylic acids or mixtures thereof and olefines of low molecular weight or mixtures containing olefines of low molecular weight, and has special reference to esters and the production thereof from paraffin mono-carboxylic acids having five or less number of carbon atoms to the molecule or mixtures thereof (hereinafter referred to as "the organic acid") and olefines containing seven or less number of carbon atoms to the molecule (hereinafter termed "olefine" or "olefines").

The main object of the invention is to bring about the combination of olefines and organic acids as defined above in an improved and continuous manner.

According to the invention the organic acid is caused catalytically to combine with an olefine or olefines by bringing the organic acid into contact with the olefine or olefines in the presence of a chemically active or catalytic agent at a temperature above the boiling point of the resulting product under the particular reaction conditions. These conditions include those due to the presence of an excess of adsorbent, to the rate of addition of the gas, to the concentration of olefines and also to the pressure in the reaction chamber. Suitable chemically active or catalytic agents may comprise chlorides, bromides, phosphates and sulphates of certain metals, viz: zinc, aluminum, mercury, copper, cadmium, bismuth and antimony; mineral acids which are relatively non-volatile under the particular reaction conditions such as sulphuric and phosphoric acids, and also addition products of these mineral acids comprising the metal acid salts and the alkyl and aryl acid derivatives all of which have ionizable hydrogen in the molecule. An example of such a metal acid salt is sodium hydrogen sulphate; an example of such an alkyl acid derivative is ethyl sulphuric acid; and an example of such an aryl acid derivative is benzene sulphonic acid. Any one of these chemically active or catalytic agents may be used alone or in combination with another, always provided that where two or more chemically active or catalytic agents are employed together a mutual decomposition giving rise to undesirable products does not occur. For instance it would not be possible to employ mineral acid together with chlorides since these might react to produce free hydrochloric acid which might then react with some of the olefine or olefines present. For convenience a non-reactive carrier which may be porous or adsorbent may be employed under suitable conditions for the chemically active or catalytic agent.

The reaction may be conducted below, at or above atmospheric pressure and heat may be added or abstracted as may be found necessary, it being desirable to keep the temperature as little above the boiling point of the ester produced as will ensure the swift removal of the latter from the sphere of reaction. This makes it possible to work the improved process of manufacture continuously and/or in successive stages and also to minimize decomposition and the formation of undesirable by-products.

The olefine or olefines in some cases may be diluted or mixed with other substances as for instance when products resulting from the thermal decomposition of mineral oils are employed.

The ester produced is carried out of the reaction vessel or vessels in the form of vapor together with the excess of reagents and effluent products and may be condensed and separated in any well known manner. If desired the excess reagents may be passed successively to a number of reaction vessels until substantially the whole of the olefine and organic acid have combined. The reaction and recovery of the esters is in this way a continuous process.

The following examples show how the invention may be put into practice:—

*Example 1*

500 parts of adsorbent carbon and 50 parts of a 75% solution of phosphoric acid are mixed and heated to between 150° C. and 250° C. for two hours in a current of air to remove excess of moisture and then placed in a vessel having heating means and provided with inlet and outlet connections so placed that the vapors passing through the vessel are brought into contact with the adsorbent mass. The latter is maintained at a temperature of about 110° C. and a stream of a mixture of approximately equal parts of acetic acid vapor and propylene is passed through at the rate of about 2 grams per cubic centimetre volume of adsorbent per minute. The products of the reaction together with excess of the raw materials pass from the vessel and the acetic acid and propyl acetate may, by cooling, be condensed together with any liquid by-products. Unchanged propylene passes through the condensers and may be submitted to a subsequent identical treatment either in the same reaction vessel or in successive reaction vessels. 15–20% of the propylene is converted into the acetate by passage through an impregnated carbon adsorbent bed (prepared as above) 8" thick. Very small quantities only of by-products are formed.

*Example 2*

Adsorbent carbon is treated with 10% of its weight of a 50% solution of zinc chloride and heated as in Example 1 to form an impregnated adsorbent bed. The sequence of operations described in Example 1 is followed with similar results. The amount of the by-products is about double that obtained when using the phosphoric acid impregnated adsorbent.

I claim as my invention:

1. A vapor phase process for the manufacture of esters from an aliphatic saturated mono-carboxylic acid having no more than 5 carbon atoms to the molecule and an olefine containing no more than 7 carbon atoms to the molecule, characterized in that said mono-carboxylic acid and said olefine are introduced together in the vapor state into contact with a catalytic agent at a temperature above the boiling point of the ester corresponding to said mono-carboxylic acid and said olefine which is continuously removed from the sphere of action and recovered.

2. A process for the manufacture of esters according to claim 1, wherein the catalytic agent employed is a metal salt of a strong mineral acid selected from the group consisting of chlorides, bromides, phosphates or sulphates of zinc, aluminum, mercury, copper, cadmium, bismuth or antimony.

3. A process for the manufacture of esters according to claim 1, wherein the catalytic agent employed comprises essentially a strong mineral acid which is relatively non-volatile under the particular reaction condition.

4. A process for the manufacture of esters according to claim 1, wherein the catalytic agent comprises essentially an addition product of a strong relatively non-volatile mineral acid, said addition product having ionizable hydrogen in the molecule.

5. In a vapor phase process for the manufacture of esters, the steps which consist in providing an adsorbent mass by mixing substantially 500 parts of adsorbent carbon and 50 parts of a 75% solution of phosphoric acid and heating the mix to a temperature between 150° C. and 250° C. in a current of air to remove the excess of moisture from the mass, placing the adsorbent mass in a vessel capable of being heated and having an inlet and outlet connection, maintaining said mass at a temperature of about 110° C. and passing a mixture stream of approximately equal parts of acetic acid vapor and propylene through said vessel and the adsorbent mass therein, at the rate of approximately 2 grams per cubic centimetre volume of adsorbent mass per minute.

6. In a vapor phase process for the manufacture of esters, the steps which consist in treating an adsorbent carbon with an amount of 50% solution of zinc chloride approximating 10% of the weight of the carbon to form an adsorbent mass and heating the treated carbon to a temperature between 150° C. and 250° C. in a current of air to remove the excess of moisture from the carbon, placing the treated carbon in a vessel capable of being heated and having inlet and outlet connections, maintaining the carbon at a temperature of about 110° C. and passing a mixture stream of approximately equal parts of acetic acid vapor and propylene through said vessel and the adsorbent carbon therein at a rate approximating 2 grams per cubic centimetre volume of treated adsorbent carbon per minute.

7. A process for the manufacture of esters according to claim 1 wherein the catalytic agent is employed on a porous carrier.

8. A process for the manufacture of esters according to claim 1 wherein the catalytic agent is employed on an adsorbent carrier.

THOMAS KANE.